United States Patent [19]

Sudo et al.

[11] Patent Number: 4,543,125
[45] Date of Patent: Sep. 24, 1985

[54] PROCESS OF MAKING STEEL IN CONVERTER USING A GREAT AMOUNT OF IRON-BEARING COLD MATERIAL

[75] Inventors: Fumio Sudo; Tetsuya Fujii; Yoshiei Kato; Sumio Yamada; Kanji Emoto, all of Chiba, Japan

[73] Assignee: Kawasaki Steel Corporation, Kobe, Japan

[21] Appl. No.: 649,918

[22] Filed: Sep. 12, 1984

[30] Foreign Application Priority Data

Feb. 16, 1984 [JP] Japan .................................. 59-26131

[51] Int. Cl.[4] .............................................. C21C 7/00
[52] U.S. Cl. ......................................... 75/51.5; 75/46
[58] Field of Search ...................................... 75/46, 60

[56] References Cited

U.S. PATENT DOCUMENTS 3,231,369  1/1966  Gorlich .................................. 75/46
3,985,549 10/1976  Rheinlander ........................... 75/46

Primary Examiner—Peter D. Rosenberg
Attorney, Agent, or Firm—Balogh, Osann, Kramer, Dvorak, Genova & Traub

[57] ABSTRACT

A process for producing a steel in at least two converters using a great or substantial amount of an iron-bearing cold material. The iron-bearing cold material and a carbonaceous material are supplied into one of the converters under the presence of a molten iron or a preliminarily treated molten iron and are melted therein under oxygen-blowing to obtain a preliminarily treated molten iron containing a high content of carbon, and the preliminarily treated molten iron is refined in the other converter under oxygen-blowing to obtain a molten steel having the given composition.

3 Claims, 2 Drawing Figures

PROCESS OF MAKING STEEL IN CONVERTER USING A GREAT AMOUNT OF IRON-BEARING COLD MATERIAL

BACKGROUND OF THE INVENTION (1) Field of the Invention

The present invention relates to a steelmaking process in a converter using a great or substantial amount of a so-called solid iron-bearing cold material such as cold iron, pellet, scrap and the like under oxygen blowing. More particularly, the invention relates to a steelmaking-refining technique which permits a cheaper production of a high quality steel free from a contamination of a molten steel due to resulfurization, re-phosphorization and so on and also conspicuously prolongs a converter durable life.

(2) Description of the Prior Art

According to the usual converter refining, it is a common practice that a relatively small amount of scrap is added to a molten iron supplied from a blast furnace, and a slag-forming agent and a high flow rate of oxygen are supplied thereto to carry out oxygen-blowing.

In this usual converter refining, the amount of the scrap for the total amount of all the materials charged into the converter is limited to 20% due to the restriction of a heating source.

Thus, a large amount of the scrap cannot be used in this process.

For overcoming this restriction, as the steelmaking process in which a large amount of the iron-bearing cold material which is in the total amount or in the major part the scrap or cold iron is used and such an iron-bearing cold material is refined by means of a converter, there is a technique as proposed in W. German Pat. No. 28 38 983 that the so-called scrap is charged into the converter, and is preheated by using nozzles installed at the bottom of the converter as burner and then completely melted, if necessary by adding a small amount of molten iron; a carbonaceous material such as coke powder or the like is blown into the converter through the nozzles of the converter bottom, and at the same time oxygen is blown from a lance or the bottom nozzles, thereby refining the molten iron.

However, according to this technique, since the heat efficiency is low, it takes an extremely long time to preheat and completely melt the cold material. Further, even if the refining is started, it also takes a long time to complete refining. Therefore, this process has defects in that it is in no harmony with the operation schedule of the succeeding continuous casting apparatus making the synchronization difficult and in that the damage to the converter wall is vigorous to lower the durable life of the converter.

In addition, Japanese Patent Laid-Open Application No. 56(1981)-58,916, discloses a process of making steel from a solid iron-bearing material by using a converter provided with oxygen top-blowing devices and carbonaceous material introducing nozzles, in which a molten steel of an excessive amount of 10-30% than the amount per one charge is produced from scrap by refining and the excessive amount of molten steel remains in the converter and the next scrap is charged therein and the succeeding refining is carried out.

However, according to this process, a part of the molten steel is consecutively left for the succeeding steps in the same converter, and therefore, it has the following defects:

(i) A sulfur component in the carbonaceous material such as coal (S: 0.44%, ash: 13.7%, VM: 13.1%) and coke (S: 0.57%, ash: 17.1%) used in a large amount is included in the molten steel.

(ii) Since there exists a wide range of temperature change from the scrap-melting to decarbonization-refining, and the temperature becomes high at the time of discharging, the durable life of a refractory material is short.

(iii) Since the continuous refining is performed from the scrap-melting to the blowing-termination in a single converter, the same is used for a long period of time. Therefore, a large amount of hydrogen from heat decomposition of propane or the like used for protecting (cooling) the bottom-blown tuyeres is absorbed into the molten steel.

SUMMARY OF THE INVENTION

It is therefore an object of the present invention to provide a steelmaking process which can eliminate the above defects of the prior art converter-refining by use of a large or substantial amount of scrap as raw material relative to molten iron and in which at least two converters are selectively used.

According to the invention, at least two converters are used, and a large or substantial amount of an iron-bearing cold material and a carbonaceous material are supplied into one of the converters under the presence of a molten iron or a preliminarily treated molten iron and the iron-bearing cold material is melted by blowing oxygen to obtain the preliminarily treated molten iron containing a large amount of carbon.

The preliminarily treated molten iron means molten iron produced by melting scrap with molten iron in the converter, and is not merely the molten iron from the blast furnace. Then, refining is carried out in the other converter using the thus obtained preliminarily treated molten iron as a starting material under oxygen-blowing to obtain the molten steel with components in predetermined ranges.

According to a preferred embodiment of the invention, the converter operation in a stage for obtaining the preliminarily treated molten iron is performed in such a manner that a part of the preliminarily treated molten iron is left (or remains) in the converter and an iron-bearing cold material and a carbonaceous material are freshly added thereto and such treatments are repeated many times.

According to another preferred embodiment of the invention, the content of carbon in the preliminarily treated molten iron is not less than 2.5% by weight of carbon.

According to still another preferred embodiment of the invention, the slag is removed upon necessity when the molten iron preliminarily treated in the first converter is transferred to the other converter.

These and other objects, features and advantages of the invention will be well appreciated upon reading the following description of the invention when taken in conjunction with the attached drawings with understanding that some modifications, variations and changes of the invention will be easily done by the skilled in the art to which the invention pertains without departing from the spirit of the invention and the scope of the appended claims.

DETAILED DESCRIPTION OF THE INVENTION

In order to refine the iron-bearing cold material in a converter by increasing the ratio of the cold material such as scrap and the like used or by using the cold material as all the iron source, it is necessary that an exothermic reaction is induced under oxygen-blowing with the addition of an inflammable material such as coke, or coal or FeSi added thereto and the like to the converter. If the above starting materials are melted according to the usual converter refining method, there occur the above-mentioned problems.

In view of the above, the present invention aims to provide a steelmaking process using at least two converters (one being adapted to blow or add the carbonaceous material and melt the scrap into a high carbon-containing molten iron, the other being an LD converter, an ordinary decarbonization refining converter adapted for bottom-blowing, or top- and bottom-blowing) as follows:

At least two converters are used, and a large amount of the iron-bearing cold material as well as the carbonaceous material are supplied into one of the converters under the presence of a molten iron or a preliminarily treated molten iron, and are melted under oxygen-blowing to obtain a preliminarily treated molten iron of a high content of carbon. Then, refining is done in the other converter under oxygen-blowing using the thus obtained preliminarily treated molten iron as a starting material to make a molten steel of ingredients in desired ranges.

It is noted that a great or substantial amount of an iron-bearing cold material is an amount which reaches about two-thirds or more of the whole iron charge or more (See the example below, Page 10).

Figure 1:
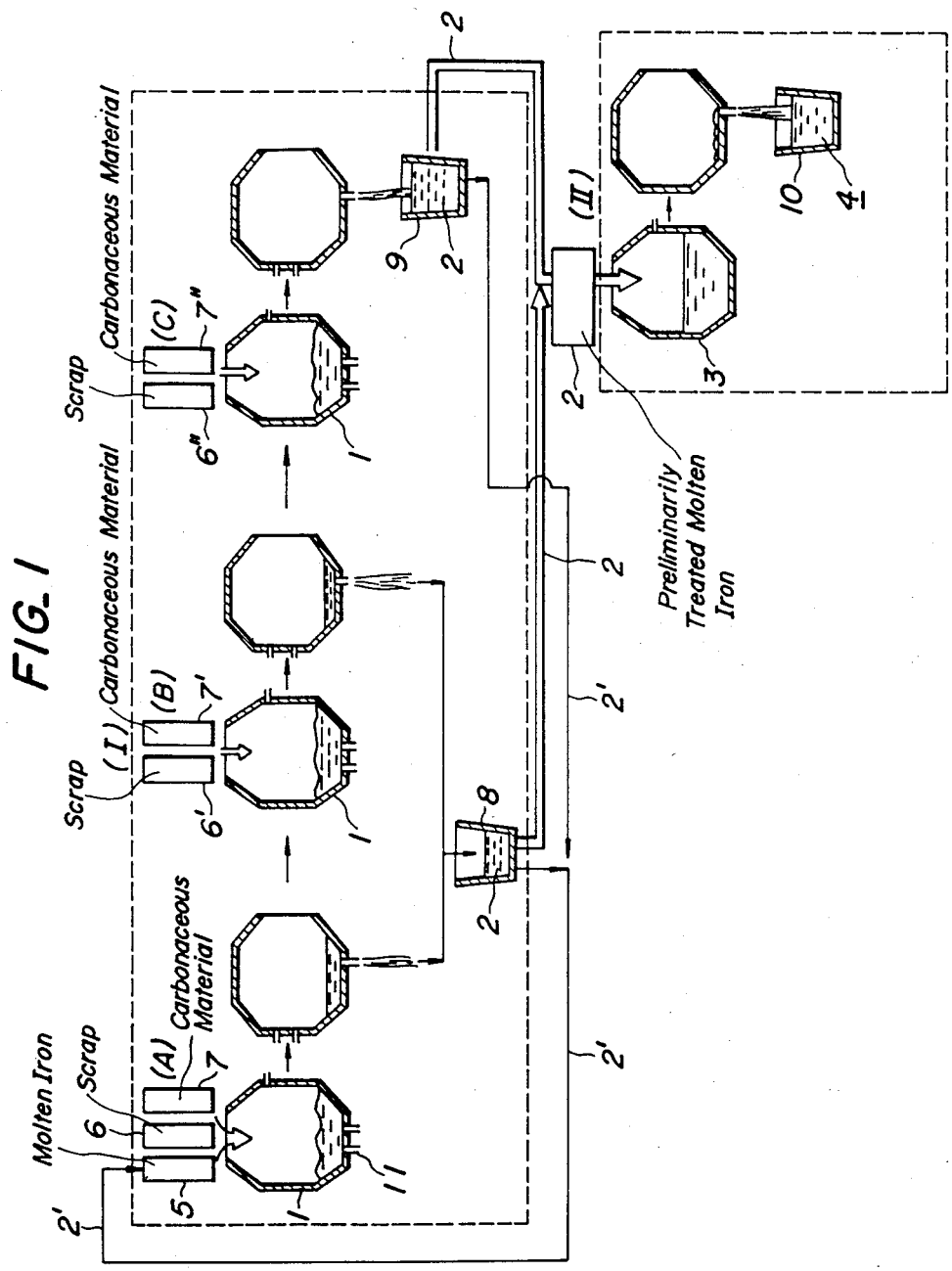
FIG. 1 is a flow chart schematically illustrating steelmaking process according to the present invention.

FIG. 1 is a schematic flow chart illustrating the concept of the invention process, which comprises a step (I) for the production of the preliminarily treated molten iron 2 in the first converter 1; and a step (II) for the production of a desired molten steel 4 in the second converter 3 using the preliminarily treated molten iron 2 as the starting material. These two steps (I) and (II) will be explained more in detail as follows:

Step (I):

(1) First, at Stage (A), a molten iron 5 which is a molten iron from a blast furnace, a molten iron from an electric furnace, or a part 2' of the preliminarily treated molten iron (circulated portion), the iron-containing cold material 6 such as scrap, cold iron etc., and the carbonaceous material 7 such as coal, coke, etc. are charged into the first converter 1 or blown thereinto through tuyeres 11, and are melted through oxygen-blowing. A part of the thus molten iron is discharged into a ladle 8. Subsequently, at Stage (B), scrap 6' and a necessary amount of carbonaceous material 7' are additionally charged or blown into the same converter 1 (in which the molten iron is still partially still), and is completely melted through oxygen-blowing. A part of the thus melted iron is again discharged into the ladle 8, but the remaining part of the molten iron is left in the converter 1. Lastly, at Stage (C), scrap 6" and carbonaceous material 7" are additionally charged or blown into the converter 1 as in the case of Stage (B), and are melted under oxygen-blowing. Step (I) is terminated at a time when a preliminary treated molten iron 2 is obtained through melting in a necessary amount for supplying to the succeeding step (II), and the molten iron in the converter 1 is all poured into a ladle 9.

Any slag formed at this stage is removed. As shown in FIG. 1, a part 2' of the preliminarily treated molten iron 2 may be circulated as the molten iron seed (molten iron) 5 to be used at the beginning of the operation in Stage (A) from the ladle 8 positioned at a place where Stage (B) terminates or the ladle 9. Although the above specific example refers to three Stage (A) to (C) as the first Step (I), the number of the stages may be reduced or increased so long as the preliminarily treated molten iron 2 can lastly be prepared in a necessary amount. Further, in the case that more than two converters, for instance, three converters are arranged, two converters are used as the converters for preparing the preliminarily treated molten iron 2 containing a high amount of carbon and the other one is used as the converter for decarbonizing and refining the molten iron, whereby the preliminarily treated molten iron 2 is rapidly melted, and the decarbonization-refining converter can continuously melt the steel.

Figure 2:
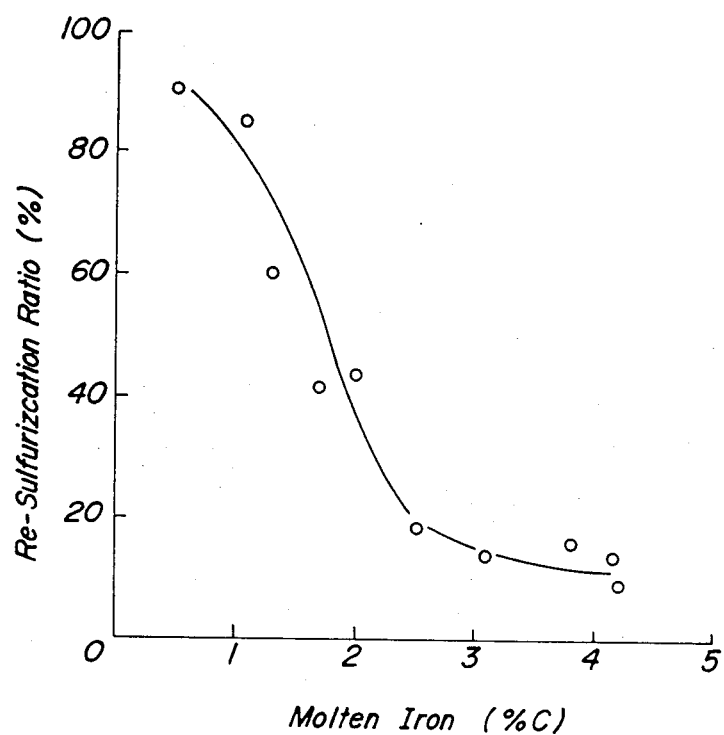
FIG. 2 is a graph showing the relation between the amount (%) of carbon in a molten iron and a re-sulfurization ratio.

FIG. 2 shows the relation between the concentration of carbon and the re-sulfurization ratio. From this figure, it is understood that in order to sustain the re-sulfurization ration $\eta$ to be lower, it is necessary to restrain the concentration of carbon in the preliminarily treated molten iron 2 to be not more than 2.5% ((C%)$\geq$2.5%). In actual, this carbon is indispensable as heating source in the oxidation reaction in Step (II).

The re-sulfurization ratio is determined as follows:

$$\eta = \frac{\text{Weight (kg) of sulfur in molten iron}}{\text{Weight (kg) of sulfur in carbonaceous material}} \times 100$$

Step (II):

The preliminarily treated molten iron 2 obtained in the step (I) is poured from the ladle 9 to a second separate converter 3 and oxygen is blown from a lance and/or bottom-blown tuyeres to effect the steelmaking-refining in accordance with the ordinary process. Then, the molten steel 4 having the desired components is discharged into the ladle 10.

Alternatively, the preliminarily treated molten iron 2 in the ladle 8 which has been produced until the step (I)(B) may be joined together with the molten steel in the ladle 9 into the second converter 3, and then subjected to refining.

According to the present invention, the following advantages can be obtained as compared with the case where all Step (I), Stages (A) to (C) and Step (II) are conducted in a common converter:

(i) It is merely necessary to modify only one converter in the prior converter installation so as to provide the necessary structure for adding a carbonaceous material into the converter as a heating source.

(ii) Employment of two converters alleviates a fear that the re-sulfurization is caused by sulfur, ash component and the like contained in the carbonaceous material added. Further, according to the present invention, since Step (II) predominantly effects the decarburization-refining, if the refining is carried out by using a top-blown lance, absorption of hydrogen from the tuyere-cooling gas such as propane, etc., is reduced. Even if the bottom-blowing is effected, the hydrogen absorption is restrained to a lower level because of extremely shortened refining period of time in total.

(iii) Since the scrap is used as a main starting material, the use amount of the slag-forming agent for desulfurization and dephosphorization (the amount of P contained in the scrap being inherently small) may be smaller, thereby resulting in increased iron yield and decreased ferroalloy.

(iv) Since two converters can be simultaneously operated, the total blowing time can be shortened and the synchronized operation with the continuous casting apparatus is easy.

(v) The method according to the invention is suitable for the melting of the extremely low S.P steel.

(vi) Since there is no fear for the re-sulfurization, the slag coating for the protection of the converter wall can be safely applied, so that the unit consumption of the refractory material is reduced, and the converter durable life is increased.

The invention will be explained more in detail by referring to an example in comparison with a comparative example, but such an example is merely illustrative of the invention and never interpreted to limit the scope of the invention.

EXAMPLE

The steelmaking was done using two converters in accordance with the steps shown in FIG. 1.

Step (I): By use of the bottom-blown converter, 500 kg/min of coal was introduced, 250 kg/min of which being thrown down from a throat, while the remaining 250 kg/min being injected from three tuyeres of the totally seven tuyeres.

Stage (A):
(i) Scrap: 30 ton, blast furnace molten, iron: 60 tons
(ii) limestone (CaO): 0.5 ton, coal: 10.3 tons, oxygen: 8,050 $Nm^3$, propane: 320 $Nm^3$
(iii) discharged molten iron (%): (C/3.51, Mn/0.30, P/0.005, S/0.008): 25 tons, 1,460° C.
(iv) time between the scrap-charging and molten iron discharging: 24 minutes Stage (B):
(i) Scrap: 45 tons
(ii) limestone: 0.4 ton, coal: 12 tons, oxygen: 11,200 $Nm^3$, propane: 450 $Nm^3$
(iii) discharged molten iron (%) (C/3.43, Mn/0.32, P/0.007, S/0.011): 42 tons, 1,470° C.
(iv) time between the scrap-charging and the molten iron discharging: 22 minutes Stage (C):
(i) Scrap: 43 tons
(ii) limestone: 0.6 ton, coal: 9 ton, oxygen; 5,450 $Nm^3$, propane: 222 $Nm^3$
(iii) discharged molten iron (%) (C/3.20, Mn/0.29, P/0.006, S/0.009): 104 tons, 1,460° C.
(iv) time between the scrap-charging and the molten iron-discharging: 19 minutes Step (II): 104 tons of the molten iron (1,460° C.) obtained in the above Stage (C) was refined under the following conditions using a top-blown converter (LD converter).
(i) blown oxygen: 3,600 $Nm^3$, limestone (CaO): 0.6 ton
(ii) discharged molten steel: 102 tons temperature of discharged molten steel: 1,660° C. molten steel components (%) (C/0.04, Mn/0.20, P/0.007, S/0.007, H/1.7 ppm)
(iii) time period between the molten iron-charging and molten steel-discharging: 20 minutes As a result, the total melting time in step (I) is 65 minutes, and the refining time in the LD converter in step (II) is 20 minutes. When the step (II) is carried out during Stage (A) in the next step (I), it is possible to make 100 tons of molten steel in about 65 minutes. This enables the synchronized operation with the continuous casting apparatus, which is in turn capable of being synchronized with other continuous casting apparatus. Further, since the components S and H in the molten steel are suppressed to low levels, it is possible to make blowing at the minimum amount of the slag and CaO can be saved. The erosion rate of the tuyeres is 0.3 mm/heat in the average in the case of the seven tuyeres, and it was found that this process is good for the converter durable life.

COMPARATIVE EXAMPLE

This comparative example is a case where the operation was substantially similarly carried out in the technique of Japanese Patent Laid-Open Application No. 56(1981)-58,916 in which step (II) is performed instead of Stage (C) using the same single converter as in the case of step (I) in the above Example.

Stage (A):
(i) scrap 30.6 tons+molten iron: 60 tons
(ii) limestone (CaO): 0.5 tons, coal: 11 tons, oxygen: 8,500 $Nm^3$, propane: 340 $Nm^3$
(iii) discharged molten iron (%) (C/3.25, Mn/0.27, P/0.004, S/0.010): 30.5 tons, 1,482° C.
(iv) time between the scrap-charging and the molten iron discharging: 25 minutes Stage (B):
(i) scrap 40 tons
(ii) limestone: 0.5 ton, coal: 12 tons, oxygen: 10,700 $Nm^3$, propane: 428 $Nm^3$
(iii) discharged molten iron (%) (C/3.51, Mn/0.34, P/0.007, S/0.009): 40.2 tons, 1,460° C.
(iv) time between the scrap-charging and the molten iron-discharging: 21 minutes.

Stage corresponding to the Stage (C) and Step (II):
55.6 tons of scrap was added subsequent to the above Stage (B).
(i) limestone: 1.5 tons, coal: 6.8 tons, oxygen: 8,500 $Nm^3$, propane: 340 $Nm^3$
(ii) discharged molten steel: 98 tons, 1,670° C. molten steel composition (%) (C/0.01, Mn/0.1, P/0.04, S/0.053, H/9.8 ppm)
(iii) time between the molten iron-charging and the molten steel discharging: 41 minutes As a result, the total blowing time was 87 minutes, and it was found that this comparative example was time-consuming as compared with the above Example (65 minutes). As compared with the molten iron discharged in Stage (B) in which the content of S is 0.009%, the content of sulfur in the compositions in the final molten steel is as high as 0.053% through re-sulfurization and the content of hydrogen is higher than that in the case of the above Example, too. The erosion rate of the tuyeres is 10.4 mm in the average, and larger as compared with the Example of this application, so that the comparative example adversely affected the converter durable life as compared with the above Example. In this respect, the durable life of the refractory material is further shortened due to the temperature difference of about 200° C. between the discharged molten iron and the discharged molten steel and the longer refining time period.

As mentioned above, according to the present invention, when the refining is performed in the converter using a large amount of the scrap and so on, it is possible to effectively restrain the re-sulfurization, re-phosphorization and inclusion of hydrogen as coventionally observed, so that the method of the invention is suitable for the production of a high quality steel at a cheap cost. Further, the durable life of the converter can be prolonged due to a smaller load onto the refractory material. As a matter of course, in addition to the above effects, those referred to somewhere in the foregoing description of the invention are included in the effects of the invention.

What is claimed is:

1. A process for producing a steel in a converter using a substantial amount of an iron-bearing cold material, which comprises using at least two converters, supplying an amount of the iron-bearing cold material which corresponds to about two-thirds and more of the whole iron charge, and a carbonaceous material into one of the converters in the presence of at least one selected from the group consisting of a molten iron and a preliminarily treated molten iron, the preliminarily treated molten iron being formed by melting scrap with molten iron in the converter, melting the iron-bearing cold material by blowing oxygen to obtain a preliminarily treated molten iron containing not less than 2.5 weight % of carbon, and refining said preliminarily treated molten iron in the other converter under oxygen-blowing to obtain a molten steel having a given composition.

2. A process as set forth in claim 1, wherein the operation of the converter at the stage where the preliminarily treated molten iron is formed includes leaving a part of the formed preliminarily treated molten iron in the converter and freshly supplying an iron-bearing cold material and a carbonaceous material thereto and repeating these steps several times.

3. A process as set forth in claim 1, wherein any formed slag is removed when the preliminarily treated molten iron is transferred into the other converter.

* * * * *